United States Patent
Ramakrishnan et al.

(10) Patent No.: US 7,173,947 B1
(45) Date of Patent: Feb. 6, 2007

(54) METHODS AND APPARATUS TO EVALUATE STATISTICAL REMULTIPLEXER PERFORMANCE

(75) Inventors: Sangeeta Ramakrishnan, San Jose, CA (US); Fang Wu, San Jose, CA (US); Xiaomei Liu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 09/998,546

(22) Filed: Nov. 28, 2001

(51) Int. Cl.
*H04J 3/02* (2006.01)
*H04J 1/16* (2006.01)
*H04J 3/14* (2006.01)

(52) U.S. Cl. .................... 370/537; 370/242; 370/252
(58) Field of Classification Search ................ 370/537, 370/242, 403, 412, 503
See application file for complete search history.

(56) References Cited

U.S. PATENT DOCUMENTS

| | | | |
|---|---|---|---|
| 5,861,919 A | | 1/1999 | Perkins et al. |
| 5,862,140 A | | 1/1999 | Shen et al. |
| 6,002,687 A | * | 12/1999 | Magee et al. ............... 370/394 |
| 6,192,083 B1 | | 2/2001 | Linzer et al. |
| 6,239,834 B1 | * | 5/2001 | Miyaji et al. ............... 348/193 |
| 6,625,320 B1 | * | 9/2003 | Nilsson et al. .............. 382/238 |
| 6,643,327 B1 | * | 11/2003 | Wang .................... 375/240.12 |
| 6,724,825 B1 | * | 4/2004 | Nemiroff et al. ...... 375/240.27 |
| 6,847,656 B1 | * | 1/2005 | Wu et al. .................... 370/477 |
| 6,904,094 B1 | * | 6/2005 | Liu et al. ............... 375/240.13 |
| 6,959,042 B1 | * | 10/2005 | Liu et al. ............... 375/240.02 |
| 2002/0067768 A1 | * | 6/2002 | Hurst ..................... 375/240.03 |
| 2002/0136538 A1 | * | 9/2002 | Chen .......................... 386/111 |
| 2003/0081676 A1 | * | 5/2003 | Lin et al. ................ 375/240.12 |
| 2005/0041689 A1 | * | 2/2005 | Wu et al. .................... 370/477 |

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.
Huifang Sun, "Architectures for MPEG Compressed Bitstream Scaling", IEEE Transactions on Circuits and Systems for Video Technology, vol. 6, No. 2, Apr. 1996, pp. 191-199.
Wei Ding, "Joint Encoder and Channel Rate Control of VBR Video over ATM Networks", IEEE Transactions on Circuits and Systems for Video Technology, vol. 7, No. 2, Apr. 1997, pp. 266-278.

* cited by examiner

*Primary Examiner*—Chirag G. Shah
(74) *Attorney, Agent, or Firm*—Beyer Weaver & Thomas, LLP

(57) ABSTRACT

The present invention relates to methods and apparatus for quantitatively measuring the performance of a statistical remultiplexer. The methods of the present invention provide for generation of evaluation metrics associated with at least one of amount of bit rate reduction performed by the statistical remultiplexer, change in video quality attributable to the statistical remultiplexer, wasted output bandwidth by the statistical remultiplexer, decoder buffer level fullness, bit rate reduction characteristics of the statistical remultiplexer, and time delay attributable to the statistical remultiplexer.

The methods of the present invention may be implemented by an evaluator that may be incorporated into a statistical remultiplexer or may be separate from and connectable to a statistical remultiplexer.

18 Claims, 12 Drawing Sheets

MPEG elementary video bit stream
400 elementary video bit stream including
bit rate and/or other video information
600

METHODS AND APPARATUS TO EVALUATE STATISTICAL REMULTIPLEXER PERFORMANCE

FIELD OF THE INVENTION

The present invention relates generally to methods and apparatus for evaluating devices that transmit data, including video data. More specifically, the present invention relates to methods and apparatus for evaluating the performance of a statistical remultiplexer.

BACKGROUND OF THE INVENTION

Video services are provided by a wide array of video content suppliers. For example, residential digital video services may include digital television, video on demand, Internet video, etc.—each service having hundreds of programs. A program refers to one or more bit streams that are used to represent the video content and associated audio content. A target receiver for the programs, such as a set-top box (STB) located in a residential home, receives video programs from a number of different video content suppliers via assorted transmission channels. Typically, the "last mile" of transmission between the video content suppliers and the target receiver is along the same transmission channel, requiring the channel to carry multiple video programs from the wide array of suppliers, and often simultaneously.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. Many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) the medium that carries the actual signals; 3) mathematical schemes used to encode and decode the signals; 4) proper communication protocols used to establish, maintain, and manage the connection created by the channel; and 5) storage systems used to store the signals, such as magnetic tapes and optical disks. The concept of a channel includes, but is not limited to, a physical channel, but also includes logical connections established on top of different network protocols, such as xDSL, ATM, IP, wireless, HFC, coaxial cable, Ethernet, and Token Ring.

The channel is used to transport a bit stream, or a continuous sequence of binary bits used to digitally represent compressed video, audio, and/or data. A bit rate is the number of bits per second that is required to transport the bit stream. A bit error rate is the statistical ratio between the number of bits in error due to transmission and the total number of bits transmitted. A channel capacity is the maximum bit rate at which a given channel can convey digital information with a bit error rate no more than a given value.

Since the amount of video data to be transmitted with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. For example, a digitized video data having an uncompressed bit rate of roughly 120 million bits per second (Mbps) can be represented by a compressed bit stream having a bit rate of 4–6 Mbps. Compression represents significant data savings, which results in much more efficient use of channel bandwidth and storage media.

International standards have been created on video compression schemes. Examples of these standards include MPEG-1, MPEG-2, MPEG-4, H.261, H.262, H.263, etc. These compression standards rely on several algorithm schemes such as motion compensated transform coding, quantization of the transform coefficients, and variable length coding (VLC). In general, the number of bits used to represent a given image determines the quality of the encoded picture. The more bits used to represent a given image, the better the image quality. The system that is used to compress digitized video sequences using the above-described standards is typically called an encoder or encoding apparatus.

When the digital video is first compressed, the encoder assumes a particular bit rate profile, whether it is a constant bit rate (CBR) or a variable bit rate (VBR). The word "profile" refers to the fact that transport bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively.

The VBR representation of compressed video data allows a video encoder to generate compressed bit streams that, when decoded, produce consistent video quality. However, as a result of the compression process, the number of bits required to represent the compressed data differs widely from picture to picture. The specific VBR characteristics of the compressed bit stream depend on many factors including: the complexity of the video image and amount of motion in the video sequence; changes made in post-generation, such as scene cuts, fades, wipes, picture-in-picture, etc.; and the amount of stuffing bits/bytes inserted into the bit stream. Stuffing bits/bytes are code words that may be inserted into the coded bit stream to increase the bit rate to some desired bit rate and are discarded during decoding of the bit stream. As channel capacities are often expressed as constant bit rates, the variable nature of a VBR compressed bit stream often poses a problem for video transmission.

One potential consequence of exceeding channel capacity for a VBR compressed bit stream on a particular channel is compromised video quality. Commonly, if one or more bit streams contain too much data to fit within a channel, video data may be dropped from the bit stream or simplified to allow transmission, thus sacrificing end user video quality. Due to the real-time nature of compressed video transmission, dropped packets are not re-transmitted. Also, it is important to point out that compressed bit streams are usually generated by either real-time encoders or pre-compressed video server storage systems. Both are likely to be in a remote site, away from the network itself. This increases the difficulty in encoding the video signal with a resulting bit rate profile sensitive to the connection bandwidth available for a particular channel or target receiver.

To further reduce the excessive amount of video transmission, bit streams are frequently combined for transmission within a channel to make digital video data more transportable. A multiplex is a scheme used to combine bit stream representations of multiple signals, such as audio, video, or data, into a single bit stream representation.

One important benefit of the VBR compression is achieved through statistical multiplexing. Statistical multiplexing is an encoding and multiplexing process which takes advantage of the VBR nature of multiple compressed video signals. When a statistical multiplexer combines multiple bit streams, an algorithm may be used to adapt the bit rate of each VBR video signal but the total bit rate of the output multiplex is kept at a constant value. Statistical multiplexing encompasses multiplexing architecture having a reverse message path from the multiplexer to the encoders. This is also often referred to as closed-loop statistical multiplexing.

FIG. 1 illustrates a prior art example of a high level architecture for a closed-loop statistical multiplexer 100. The closed-loop statistical multiplexer (statmux) 100 has a closed-loop signal path 101 between a statmux rate controller 102 and program encoders 104 and 106. The signal path 101 provides the rate controller 102 with a global view of the bit rate requirements for each of the program encoders 104 and 106 and allows communication between the rate controller 102 and each encoder. The encoders 104 and 106 provide compressed video, audio and data bit streams to a multiplexer 105, which schedules the compressed bit streams to output a multiplexed compressed bit stream 108. Each of the encoders 104 and 106 does not have knowledge of the bandwidth requirements of data being encoded by the other encoder and hence relies on messages sent by the rate controller 102.

Based on these messages received from the statmux rate controller 102, the program encoders 104 and 106 adjust their encoding bit rate. Since the closed-loop statmux 100 relies on prompt delivery of the messages between the statmux rate controller 102 and the encoders 104 and 106, the closed-loop statmux 100 usually requires co-location of all program encoders 104 and 106, the rate controller 102 and multiplexer 105.

In applications such as video on demand, digital cable headend systems, and digital advertisement insertion systems, the requirement for the closed-loop feed back system may not provide the most optimum system efficiency as program encoders from different providers may not be co-located. Thus, an open loop statistical multiplexing architecture, termed statistical remultiplexing, is typically used to multiplex the compressed signals and to improve the overall system efficiency, and to provide better bandwidth usage and reduced transmission cost. Statistical remultiplexing is a process which accepts multiple VBR bit streams and remultiplexes them together to output a single CBR bit stream that fits within an available channel.

FIG. 2 illustrates a prior art example of a statistical remultiplexer architecture 200. The statistical remultiplexer (statremux) architecture 200 includes an statremux 201 that accepts compressed digital bit streams consisting of multiple video/audio/data programs from encoders 202 and 204. An example of a statistical remultiplexer is described in co-pending U.S. patent application Ser. No. 09/514,577, entitled "System and Method For Multiple Channel Statistical Re-Multiplexing", filed Feb. 28, 2000, and which is hereby incorporated by reference.

As earlier discussed, international standards have been created for various video compression schemes. These include MPEG-1, MPEG-2, MPEG-4, H.261, H.262, H.263, H.263+, etc. These standardized compression schemes rely on several algorithm schemes, such as motion compensated transform coding (for example, discrete cosine transform or wavelet/sub-band transforms), quantization of the transform coefficients, and variable length coding (VLC). The motion compensated encoding removes the temporally redundant information in video sequences. The transform coding enables orthogonal spatial frequency representation of spatial domain video data. Quantization of the transformed coefficients reduces the number of levels required to represent a given digitized video. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above-described schemes is called an encoder or encoding apparatus.

Commonly, transmission of video data is intended for real-time playback. This implies that all of the information required to represent a digital picture must be delivered to the destination in time for decoding and display in a timely manner. The channel must be capable of making such a delivery. However, a channel imposes a bit rate constraint for data being sent through the channel. This bit rate constraint often falls below the bit rate required to transport the compressed video bit stream. Thus, there is often a need to scale the transmission bandwidth required for the video data in order to fit within the available bandwidth of a network connection, or channel. This is often accomplished through a compression scheme, such as MPEG-2.

Currently, MPEG-2-based video/audio and data programming is the preferred choice of most cable operators as it is one of the simpler ways to make the conversion to digital video. In this manner, MPEG-2 transport streams can be packaged to create custom lineups.

FIG. 3 illustrates a prior art example of a compressed bit stream 300 having an MPEG-2 format. The MPEG-2 compression standard consists of two layers: a system layer 301 and an elementary stream layer 302. The elementary stream layer 302 typically contains the coded video and audio data and defines how compressed video (or audio) data are sampled, motion compensated (for video), transform coded, quantized, and represented by different variable length coding (VLC) tables. The basic structure for a coded video picture data is a block that is an 8 pixel by 8 pixel array. Multiple blocks form a macroblock, which in turn forms part of a slice. A coded picture consists of multiple slices. Multiple coded pictures form a group of pictures.

Each block contains variable length codes (VLC) for transform coefficients. In the MPEG-2 syntax, the picture data section contains the bulk of the compressed video images. This is where the transform coefficients are encoded as VLCs. For a typical bit stream, this portion of the data takes somewhere between 70%–90% of the total bit usage of a coded picture, depending on the coded bit rate. The MPEG-2 syntax also specifies private user data fields within the elementary stream layer 302. The private user data fields may be either of variable length or fixed length.

The system layer 301 is defined to allow an MPEG-2 decoder to correctly decode audio and video data, correctly synchronize audio and video data, and present the decoded result to the video screen in a time continuous manner. The system layer 301 comprises two sub-layers: a packetized elementary stream (PES) layer 304 and a transport layer 306 above the PES layer 304.

The PES layer 304 defines how the elementary stream layer is encapsulated into variable length packets called PES packets. In addition, the PES layer 304 includes presentation and decoding timestamps for the PES packets, which are used by a decoder to determine the timing to decode and display the video images from the decoding buffers.

The transport layer 306 defines how the PES packets are further packetized into fixed sized transport packets, e.g., packets of 188 bytes, to produce a transport stream. Additional timing information and multiplexing information may be added by the transport layer 306. For example, transport packets may contain program clock reference (PCR) values, presentation time stamps (PTS) and decoding time stamps (DTS). PCR values are related to the encoder system time clock for a particular program. A PTS indicates the time when a video picture or audio frame should be displayed or presented relative to the PCR. A DTS indicates the time when a video picture should be decoded relative to the PCR. The transport layer 306 may be utilized as a transport stream or a program stream.

The transport stream is optimized for use in environments where errors are likely such as transmission in a lossy or noisy media. Applications using the transport stream include Direct Broadcast Service (DBS), digital or wireless cable services, broadband transmission systems, etc.

The program stream is designated for use in relatively error free environments and is suitable for applications that may involve software processing of system information, such as interactive multimedia applications. Applications using the program stream include Digital Versatile Disks (DVD) and video servers.

FIG. 4 illustrates a prior art example of a MPEG elementary video bit stream. The MPEG elementary video bit stream 400 includes start code indicating processing parameters for the bit stream 400, such as a sequence start code 402, a sequence extension, including a user data header 403, a Group of Pictures (GOP) header 404, a user data header 405, a picture header 406, and a picture coding extension that includes a user data extension 407. Picture data 408 follows the picture header 406. The bit stream 400 includes a second picture header 410 preceding picture data 412.

Information in a MPEG-2 compressed bit stream also indicates the relationship between various frames within a picture. The access unit level information relates to coded pictures and may specify whether a picture is an intra frame (I frame), a predicted frame (P frame), or a bi-directional frame (B frame). An I frame contains full picture information. A P frame is constructed using a past I frame or P frame. A B frame is bi-directionally constructed using both a past and a future I or P frame, which are also called anchor frames.

FIG. 5 illustrates a prior art exemplary frame sequence 500 included in a compressed bit stream. The sequence 500 corresponds to a group of pictures in an MPEG-2 bit stream. The sequence 500 includes an initial I frame 502, P frames 504a–d and ten B frames 506a–j. The I frame 502 contains full picture information. The P and B frames are constructed from other frames as illustrated by arrows 508. Each P frame 504a–d is constructed using the I frame 502 or a previous P frame 504a–d, whichever immediately precedes the P frame (e.g., the P frame 504b uses the P frame 504a). The B frames 506a–j are bi-directionally constructed using the nearest past and future reference picture. A reference picture is either an I or a P picture. For example, the B frames 506a and 506b are constructed using the past I frame 502 and future P frame 504a.

Some statistical remultiplexers rely on information solely contained in the pre-compressed bit streams for re-encoding. The information is usually obtained by decoding the signal back to the spatial domain (baseband). When the statistical remultiplexer is configured within a network device, such as a router or headend, decoding increases complexity of the network device, slows transmission of the video data, and decreases transmission efficiency. Thus, in some compressed bit streams, a transport packet containing bit rate information and/or other data associated with the bit stream may be included in the bit stream by an encoder for extraction by a receiving statistical remultiplexer. Some statistical remultiplexers contain a mechanism for extracting this information, and can obtain information on the video signals without having to decode the signal as earlier described. An example of such a system is described in pending U.S. patent application Ser. No. 09/684,623, entitled "Methods and Apparatus for Efficient Scheduling and Multiplexing", filed Oct. 5, 2000, and which is hereby incorporated by reference.

FIG. 6 illustrates an example of an MPEG elementary video bit stream 600 having embedded bit rate and/or other video related information 607. The MPEG elementary video bit stream 600 includes start code indicating processing parameters for the bit stream 600 such as a sequence start code 602, a sequence extension including a user data header 603, a Group of Pictures (GOP) header 604, a user data header 605, a picture header 606, and a picture data 608. Picture data 612 follows the picture header 610.

The embedded data 607 may include bit rate data or other information associated with the bit stream 600. In other examples, the bit rate data and/or other video related information packet 607 may be located in different layers of the bit stream 600.

When the compressed and multiplexed channels are received, for example, by a cable operator, the channels are usually "groomed" to remove unwanted or redundant programs. The groomed channels are then remultiplexed and output as a bit stream to a customer.

Generally, a statistical remultiplexer dynamically multiplexes the various VBR channels, groomed and/or ungroomed, into a single bit stream that can be output over a channel of a fixed bandwidth which may be viewed as a CBR channel. This is usually done by varying the bandwidth allocated to each VBR channel based on its current demands to maximize utilization of the allocated bandwidth.

Typically, the input channels to the remultiplexer have been multiplexed according to a known pattern, for example, time divisional multiplexing, so that the ordering of the associated channel packets can be delayed in a queue or buffer, and then resent. Most statistical remultiplexers first attempt to shift the bit rates of the selected channels in time to achieve a bit rate within the allowable output bandwidth and within an allowable time period. According to the MPEG-2 standard, there is a limitation on the size of a receiving decoder buffer. Thus, the time shift for a compressed bit stream is limited so that it shall not underflow or overflow a receiving decoder buffer after the time shifting. After the time shifting, if the bit rate is still larger than the allowable bandwidth of the output channel, the excess bits are either dropped out of the transmission, which usually results in a poorer quality transmission, or the statistical remultiplexer utilizes a bit reduction scheme to try to retain as much of the excessive bit rate transmission as possible to maintain the transmission quality. There are many bit reduction schemes utilized by various statistical remultiplexers.

Basically, statistical remultiplexer bit rate reduction schemes process portions of a bit stream to reduce the bit rate so that the overall output bandwidth is within the allocated bandwidth. These bit rate reduction schemes typically require the decoding, bit rate reduction, and then re-encoding of the bit stream. The processing steps can usually be repeated until the output is within the allocated output bandwidth. The obvious goal of the bit rate reduction schemes is to reduce the overall output bit rate to within the allowable bandwidth of the output channel and still produce an output transmission that is as close to input quality as possible and with as little delay as possible.

FIG. 7 is a block diagram of a prior art example of the processing required for complete re-encoding. Re-encoding begins by receiving compressed video data 701. The video data 701 is then decoded, which may include variable length decoding 702, de-quantization 704, inverse transform coding 706, and motion compensation 708. Variable length coding (VLC) allows the most frequently used symbols to be represented by the shortest code word. Quantization of the transformed coefficients reduces the number of levels required to represent a given digitized video. Quantization has a direct effect on the compressed bit usage and decoded video quality. The transform coding (DCT) enables orthogonal spatial frequency representation of spatial domain video data. Motion compensation 708 includes an iterative process where P and B frames are reconstructed using a framestore memory 710.

The decoded data is then encoded by processing the video data with transform coding 712, re-quantization 714, and VLC encoding 716. After transform coding 712 and re-quantization 714, each image is decoded comprising de-quantization 718 and inverse transform coding 720 before motion compensation 722 with motion vectors provided by motion estimation 726. Motion estimation 726 is applied to generate motion vectors on a frame-by-frame basis. More particularly, a motion vector indicates an amount of movement of a macro block in an X or Y direction. Motion compensation 722 includes an iterative process where P and B frames are reconstructed using a framestore memory 724. Motion compensation 722 produces a predicted picture that is extracted 730 from the next decoded picture 728 and the residue is encoded by transform coding 712, re-quantization 714, and VLC encoding 716. This iterative process of motion compensation 722, including generation of motion vectors by motion estimation 726, produces compressed video data 732 having a lower bit rate than received (701). A lower bit rate is typically achieved by increasing quantizer values and/or changing the mode of macroblocks, etc.

For many compressed video bit stream schemes, it is possible to change the bit rate of a bit stream by simply changing the quantization step value. This approach is called re-quantization. For bit rate reduction of the video data, re-quantization 714 is performed with a larger quantization step value. The re-quantized compressed video data 732 may then be combined with other re-quantized compressed video data and transmitted onto a channel. If the resolution is also altered to achieve significantly lower bit rate reduction, this simple method cannot be used. Thus, the FIG. 7 scheme of fully decoding and re-encoding is typically used instead. As the amount of data in the compressed bit stream is reduced, the bit rate that is required for transmitting the low resolution bit stream is also reduced. Thus, enabling the bit stream to be fit within the output channel.

Ideally, a statistical remultiplexer would allocate as much bandwidth as each channel demands while minimizing bit rate reductions. Unfortunately, as most statistical remultiplexers perform some combination of packet shuffling in their buffers with some bit rate reduction process, as well as bit rate regulation using decoder buffer models, a variety of outputs result from different statistical remultiplexers. The outputs frequently have varying quality and delays.

Currently, there are no industry standards or specifications to evaluate the performance of a statistical remultiplexer. Techniques currently used to evaluate the performance of a statistical remultiplexer include visually observing the video quality at the output. Unfortunately, such evaluation methods are highly subjective and difficult to reproduce and highly expensive (due to the large number of hours of an individual's time).

In view of the above, it would be desirable to implement methods and/or apparatus that would provide a more objective evaluation of the performance of a statistical remultiplexer, as well as enable comparisons of different statistical remultiplexers.

SUMMARY OF THE INVENTION

The present invention overcomes the deficiencies and limitations of the prior art with methods and apparatus for quantitatively evaluating the performance of a statistical remultiplexer by generating evaluation metrics associated with the processing of the input compressed bit streams by a statistical remultiplexer. In some embodiments, the methods of the present invention may be performed using an evaluator device incorporated into a statistical remultiplexer. In other embodiments, the methods of the present invention may be performed using an evaluator device that is separate from the statistical remultiplexer and which is connected to the statistical remultiplexer or the input/output channels of the statistical remultiplexer. In other embodiments, the methods of the present invention may be practiced using other devices.

One aspect of the present invention provides an apparatus for generating one or more evaluation metrics associated with the performance of a statistical remultiplexer, the apparatus including: at least one input for receiving at least a portion of first data associated with the performance of a statistical remultiplexer; logic for generating second data associated with the performance of the statistical remultiplexer, wherein the second data is an evaluation metric generated using at least a portion of the first data, the second data providing a quantitative measure of the performance of the statistical remultiplexer; and at least one output for outputting the second data.

In some examples, the apparatus is integrated into a statistical remultiplexer, while in other examples the apparatus is separate from and connectable to a statistical remultiplexer.

Another aspect of the present invention provides methods for generating an evaluation metric associated with the performance of a statistical remultiplexer, the methods including: obtaining input data associated with at least a portion of one or more input compressed bit streams input to a statistical remultiplexer; obtaining output data associated with at least a portion of an output compressed bit stream output from the statistical remultiplexer; and generating an evaluation metric utilizing the input data and the output data, the evaluation metric providing a quantitative measure of the performance of the statistical remultiplexer.

In some examples, obtaining input data may include determining one or more input bit rates of at least a portion of the one or more input compressed bit streams, obtaining output data includes determining an output bit rate of the portion of the output compressed bit stream, and generating the evaluation metric includes determining the amount of bit rate reduction performed by the statistical remultiplexer utilizing the input bit rates and the output bit rate.

In some examples, obtaining input data may include determining input video quality of at least a portion of the one or more input compressed bit streams, obtaining output data may include determining output video quality of at least a portion of the output compressed bit stream, and generating an evaluation metric may include determining a difference in video quality between the input video quality and the output video quality.

In some examples, the evaluation metric may indicate at least one of an amount of bit rate reduction performed, number of frames subjected to bit rate reduction and number of bits reduced per frame.

Another aspect of the present invention provides methods for generating an evaluation metric associated with the performance of a statistical remultiplexer including: simultaneously measuring the reference clock time of an input compressed bit stream channel input to a statistical remultiplexer and the reference clock time of an output compressed bit stream channel output from a statistical remultiplexer; calculating the difference of the reference clock time of the input compressed bit stream channel and the reference clock time of the output compressed bit stream channel; and generating an evaluation metric associated with the time delay of the statistical remultiplexer.

In some examples, the time-base shift of the statistical remultiplexer is calculated and the difference is compensated by the time-base shift.

Another aspect of the present invention provides methods for generating an evaluation metric associated with the performance of a statistical remultiplexer including: determining the amount of null packets present in at least a portion of an output compressed bit stream; determining the total available output bandwidth; and generating an evaluation metric associated with the amount of wasted bandwidth in the compressed bit stream output from the statistical remultiplexer.

Another aspect of the present invention provides methods for generating an evaluation metric associated with the performance of a statistical remultiplexer having a decoder buffer model, the methods including: determining a first level of data present in a decoder buffer model at a first time; determining one or more levels of data present in the decoder buffer model at different subsequent times within a time interval, T, measured from the first time; and generating an evaluation metric associated with the decoder buffer model fullness.

In some examples, the evaluation metric is generated using the first and one or more levels of data by calculating at least one of mean level of data, maximum level of data, minimum level of data, variance in the level of data; and, median level of data present in the decoder buffer model over the time interval, T.

Another aspect of the present invention provides methods for generating an evaluation metric associated with the performance of a statistical remultiplexer, the method including: inputting one or more types of data associated with the performance of a statistical remultiplexer to an evaluator; generating at the evaluator one or more evaluation metrics associated with the performance of the statistical remultiplexer utilizing at least a portion of the one or more types of data input to the evaluator; and outputting the one or more evaluation metrics from the evaluator.

In some examples, the one or more evaluation metrics generated by the evaluator are associated with at least one of amount of bit rate reduction performed by the statistical remultiplexer, change in video quality attributable to the statistical remultiplexer, wasted output bandwidth by the statistical remultiplexer, decoder buffer level fullness, bit rate reduction characteristics of the statistical remultiplexer, and time delay attributable to the statistical remultiplexer.

Another aspect of the present invention pertains to computer program products including a machine-readable medium on which is stored program instructions for implementing any of the methods described above.

These and other features of the present invention will be presented in more detail in the following detailed description of the invention and the associated figures.

DETAILED DESCRIPTION OF THE PREFERRED EMBODIMENTS

The present invention will now be described in detail with reference to a preferred embodiment thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

Further, while the present invention is described herein with reference to MPEG-2, it will be appreciated by those of skill in the art that the present invention is also suitable for use with MPEG-1 and MPEG-4. The MPEG-1 standard is described in ISO/IEC International Standard 11172, November 1993, which is herein incorporated by reference; the MPEG-2 standard is described in ISO/IEC International Standard 13818, November 1994, which is herein incorporated by reference; and the MPEG-4 standard is described in the ISO/IEC International Standard, March 2000, which is herein incorporated by reference.

The present invention overcomes the deficiencies and limitations of the prior art with methods and apparatus for quantitatively evaluating the performance of a statistical remultiplexer using one or more evaluation metrics generated from data associated with the processing of the input compressed bit streams by a statistical remultiplexer. Some embodiments of the present invention may include an evaluator that is integrated into a statistical remultiplexer to gather the data and generate the one or more evaluation metrics. In other embodiments, the evaluator may be separate from a statistical remultiplexer and then connected to the statistical remultiplexer and/or the input/output channels to the statistical remultiplexer to gather the data and generate the one or more evaluation metrics.

Evaluators

Figure 1:
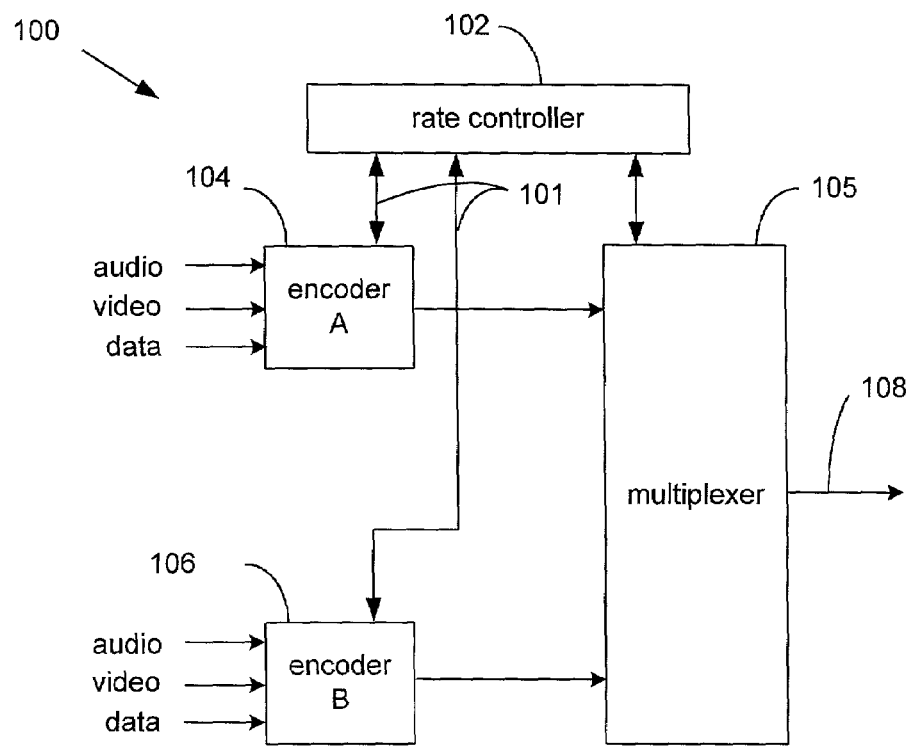
FIG. 1 illustrates a prior art example of a high level architecture for a closed-loop statistical multiplexer.
Figure 2:
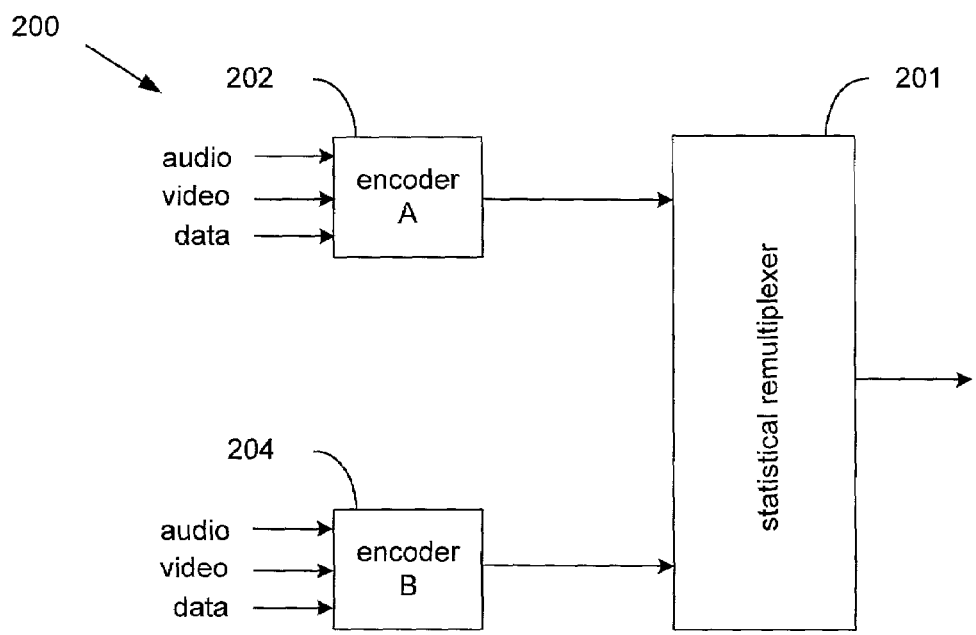
FIG. 2 illustrates a prior art example of an open-loop statistical remultiplexer architecture.
Figure 3:
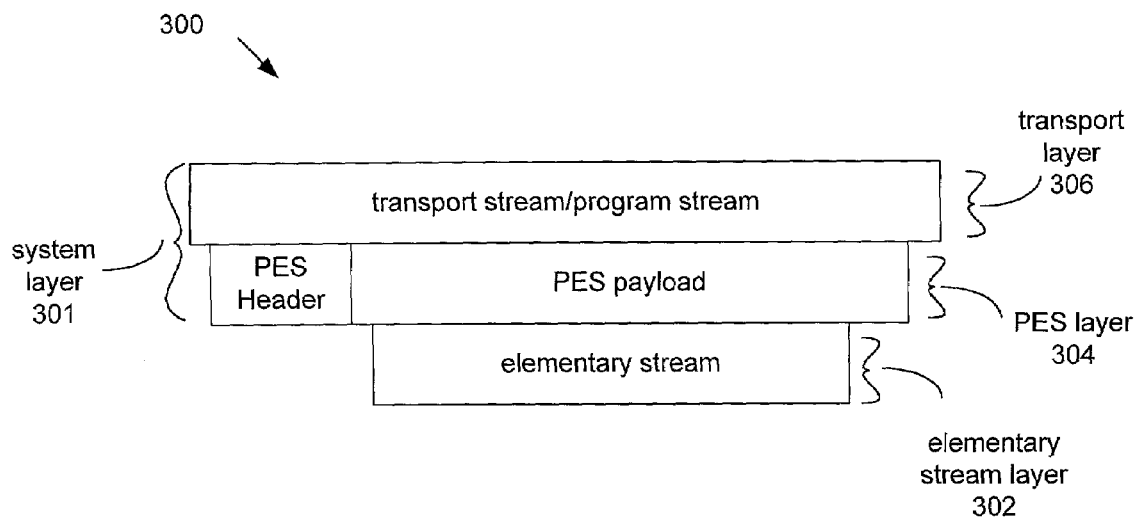
FIG. 3 illustrates a prior art example of a compressed bit stream having an MPEG-2 format.
Figure 4:
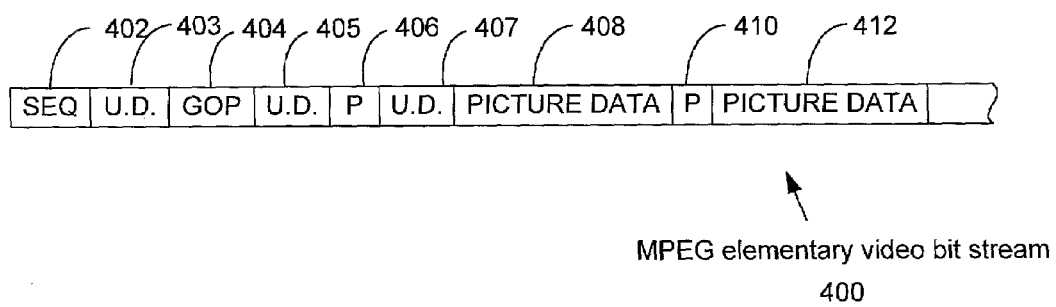
FIG. 4 illustrates a prior art example of a MPEG elementary video bit stream.
Figure 5:
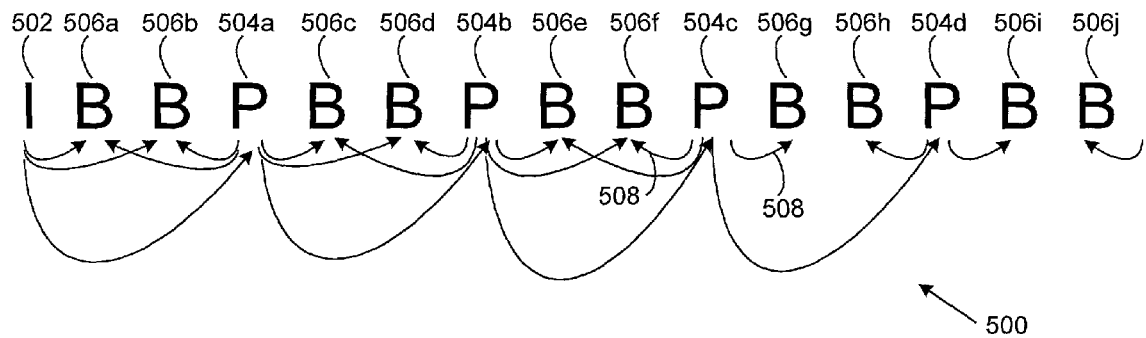
FIG. 5 illustrates a prior art exemplary frame sequence included in a compressed bit stream.
Figure 6:
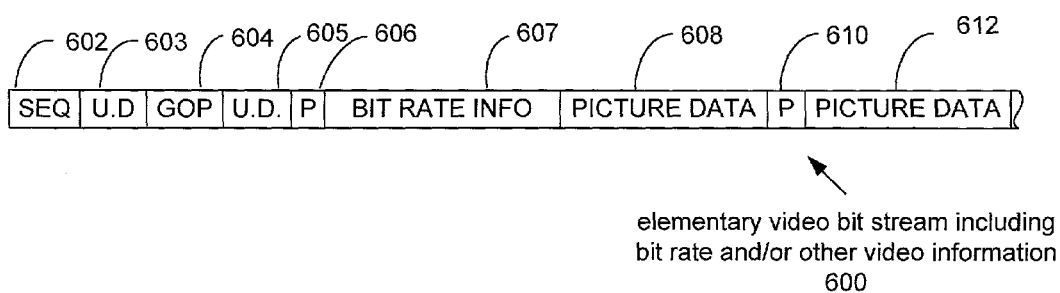
FIG. 6 illustrates a prior art example of an MPEG elementary video bit stream having embedded bit rate and/or other video related information.
Figure 7:
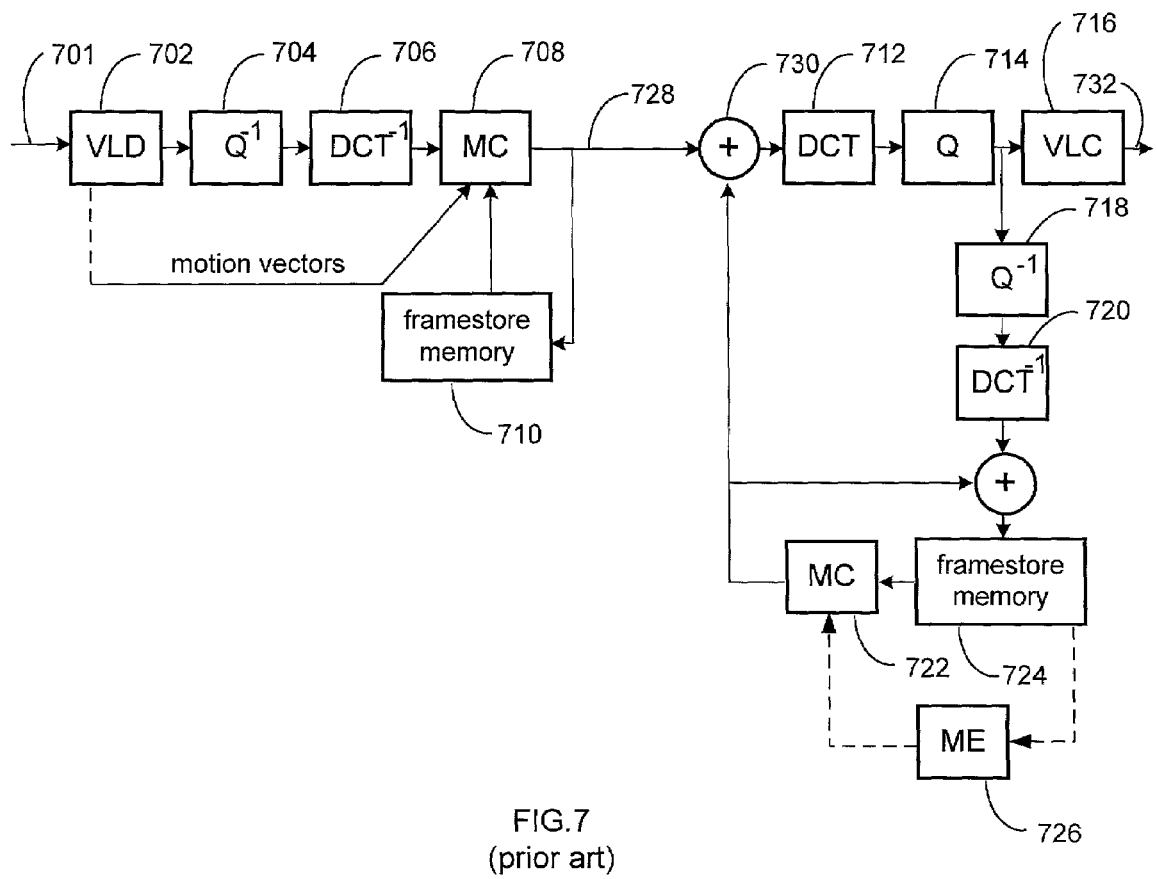
FIG. 7 is a block diagram prior art example of the processing required for complete re-encoding.

As earlier described, a statistical remultiplexer typically receives compressed bit streams that have been encoded and/or multiplexed first elsewhere. Typically, little information regarding the video data in the bit streams is available until decoding. In some instances, however, as discussed with reference to FIG. 6, the packets in the bit streams may include information that provides bit rate and/or other bit stream related data that can be determined or extracted by a statistical remultiplexer.

Figure 8:
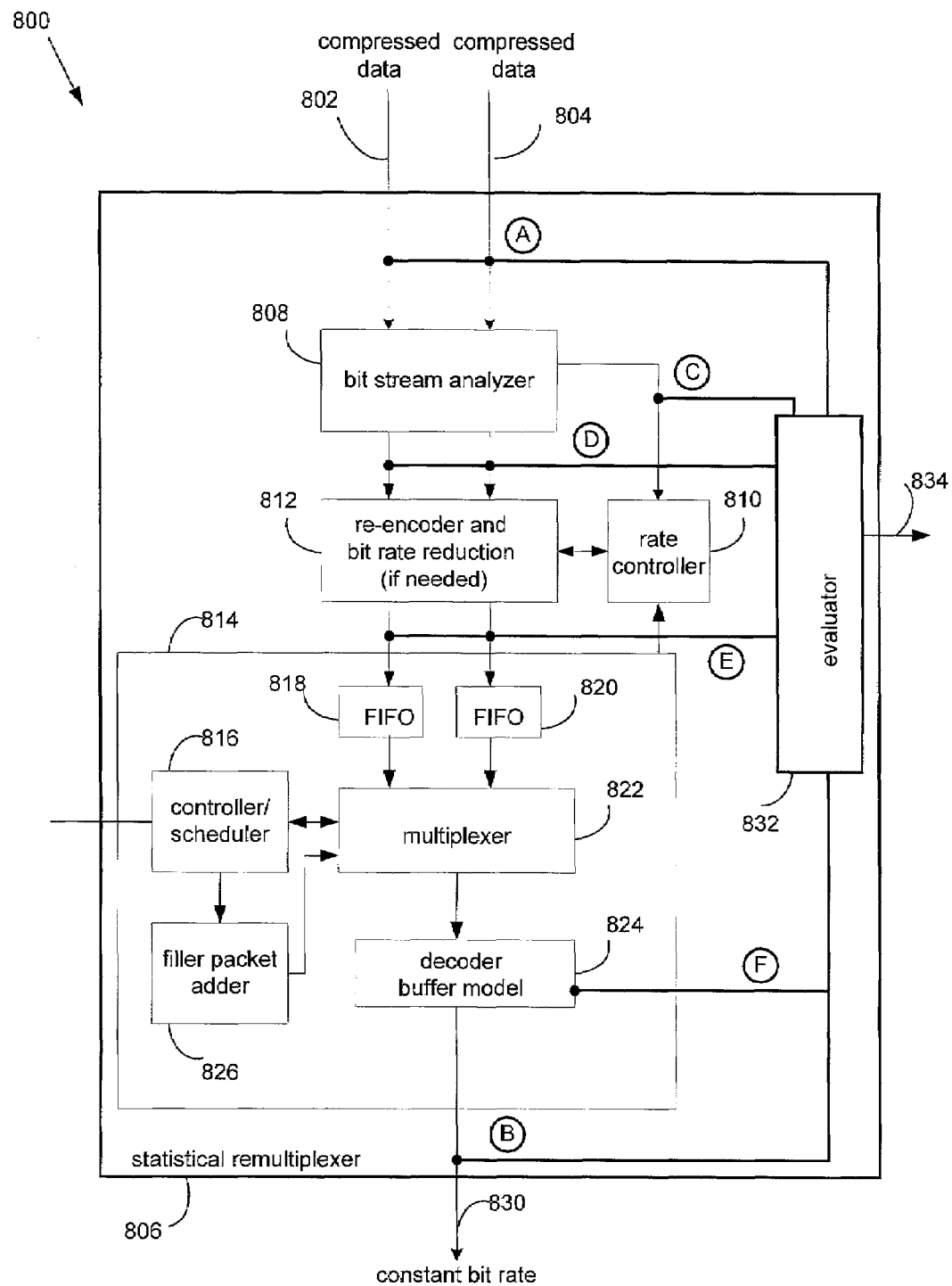
FIG. 8 illustrates an architecture including a statistical remultiplexer having an integrated evaluator according to one embodiment of the present invention.

FIG. 8 illustrates an evaluator 832 integrated into a statistical remultiplexer 806 according to one embodiment of the present invention. In this embodiment, the evaluator 832 is integrated into the statremux 806 to enable data gathering from various components of the statremux 806 utilized in generating evaluation metrics associated with the performance of the statremux.

It will be appreciated that the statremux 806 into which the evaluator 832 is integrated may have a wide variety of configurations and may include a wide variety of different mechanisms to allow processing of the compressed bit streams for output over a channel as a single bit stream. Thus, in these other embodiments, the statistical remultiplexer may include fewer or additional components. Further, it will be appreciated that the present invention, although discussed in the context of a statistical remultiplexer, may also be applied to statistical multiplexers having a closed-loop architecture that provides feed back to the encoders.

In order to more clearly illustrate various aspects of the present invention, a general description of the remultiplexing functions of the statremux 806 are described. As earlier discussed, the statremux 806 into which the evaluator 832 is integrated is described for illustrative purposes.

A statistical remultiplexer and its components perform steps to ensure that the bandwidth of the output transport medium is fully utilized. Typically, a plurality of compressed bit streams 802 and 804 are input to the statremux 806 after being initially processed, such as by demultiplexing and splitting. The compressed bit streams 802 and 804 are input to a bit stream analyzer 808 which parses the bit streams to determine the bit usage of each of the channels for some pre-determined amount of time, T seconds, ahead of what is currently being sent, in order to decide the incoming and outgoing bit rate for each bit stream. This is termed a look-ahead windowing technique. This technique involves buffering of the bit stream data up to some amount of time, T seconds. The bit stream analyzer 808 inspects the input compressed bit streams 802 and 804 to extract information that can be used to assist the re-encoding process. The information may include: decoding time (DTS) of each picture; number of bits used for each of the coded pictures, picture coding type, average quantizer scale value for each of the coded pictures, whether the coded picture is coded due to fade or scene cuts in the original video sequence, etc.

The bit stream analyzer 808 provides this information to the rate controller 810 to determine the amount and type of compression that the re-encoder 812 should perform on the bit streams 802 and 804, including bit rate reduction, if needed. The rate controller 810 uses this information to shuffle the portions of the bit streams present in the bit stream analyzer 808 to attempt to maximize the bit stream on the output channel before resorting to a bit rate reduction process, if needed. Shuffling of the bit streams is possible due to knowledge of the DTS of all the coded pictures and the current decoder buffer for every channel.

The bit stream analyzer 808 outputs the bit streams to the re-encoder 812. The re-encoder 812 compresses the bit streams using conventional methods, such as motion compensation encoding, transform coding, quantization, and variable length encoding. The re-encoder 812 may also be able to perform any of the various types of compression in response to control signals from the rate controller 810.

The rate controller 810 specifies a bit rate for the bit stream output by the re-encoder 812. The rate controller 810 receives data from the bit stream analyzer 808, specifies what bit rates are possible, and in response to signals from the scheduler/multiplexer 814, provides commands to the re-encoder 812 to perform compression that will achieve a desired bit rate, which may include implementation of various bit rate reduction processes.

The scheduler/multiplexer 814 controls the output bit stream 830 to ensure that it fully utilizes the capacity of the transport medium. The first-in/first-out (FIFO) buffers 818 and 820 temporarily store the data from the re-encoder 812 until the data can be scheduled for output through the multiplexer 822. The controller/scheduler 816 sends signals to the multiplexer 822 to control data flow from the FIFO buffers 818 and 820 into the multiplexer 822. Additionally, the filler packet adder 826 may be used to add null packets, packets containing stuffing bytes, or opportunistic data, such as program identification numbers and user information, for the times when the compressed data is insufficient to maintain a constant output bit rate over the output channel. The multiplexer 822 multiplexes the bit streams and outputs the resultant single bit stream to the decoder buffer model 824. The decoder buffer model 824 models a receiving decoder buffer and assists in regulating the bit streams to prevent an underflow or overflow of the bit stream to the receiving decoder.

In the present embodiment, the evaluator 832 is integrated into the statremux 806. This allows the evaluator 832 to be highly customized to particular data gathering points in the statremux 806. The evaluator 832 may be connected to one or more data gathering points associated with the performance of the statremux 806 for use in providing quantitative measures of the performance of the statremux 806, herein termed evaluation metrics. The evaluator 832 then utilizes at least a portion of the gathered data to generate one or more evaluation metrics that provide a quantitative measure of the performance of the statremux 806 for use in evaluating the performance of the statistical remultiplexer. It will be appreciated that the evaluator 832 may be implemented in a variety of statistical remultiplexers and, thus, the connection points of the evaluator 832 within a particular statistical remultiplexer to various data gathering points may vary widely. As such, the present embodiment should be viewed as merely illustrative of one embodiment.

For purposes of illustration, the evaluator 832 may be connected to each of the input compressed input bit streams 802 and 804 at "A" and to the output bit stream 830 at "B". This allows the evaluator 832 to gather data that relates to the input and output bit streams. For example, bit rate data for each separate input compressed bit stream 802 and 804 may be measured after any initial processing, such as demultiplexing and/or splitting, so that portions of the input compressed bit streams that are not selected for remultiplexing, e.g., are removed or blocked, are not considered as part of the input bit stream, as they will not be present in the output bit stream.

In other examples, the evaluator 832 may be connected to receive data generated by the bit stream analyzer 808 at "C". In other embodiments, the evaluator 832 may be connected to receive data input to and output from the re-encoder 812 as shown at "D" and "E". This may also include connections to input and output data associated with bit rate reduction processes.

In some examples, the evaluator 832 may be connected to receive data gathered in association with the level of data held in the decoder buffer model 824 as shown at "F".

The evaluator 832 includes logic for generating one or more evaluation metrics that provide a quantitative measure of the performance of the statistical remultiplexer into which it is integrated. Generation of the evaluation metrics is later described herein. For example, the logic may include computer code that implements any of the methods used in generating one or more evaluation metrics. Further, the evaluator 832 may include memory such as RAM and/or ROM, and may be used for storage of the gathered data, as well as the generated evaluation metric(s). The evaluator 832 may further include a CPU, as well as battery back-up, and/or a timing mechanism, such as a reference clock.

The evaluator 832 further includes an output 834 for communicating any of the obtained data and/or generated evaluation metrics. For example, the output 834 may communicate any of the aforementioned data and evaluation metrics to another system utilizing the statistical remultiplexer or to a display.

It will be appreciated that in other embodiments, the evaluator 832 may be connected to fewer or greater data collection points used in generating evaluation metrics that measure performance of the statremux 806.

Figure 9:
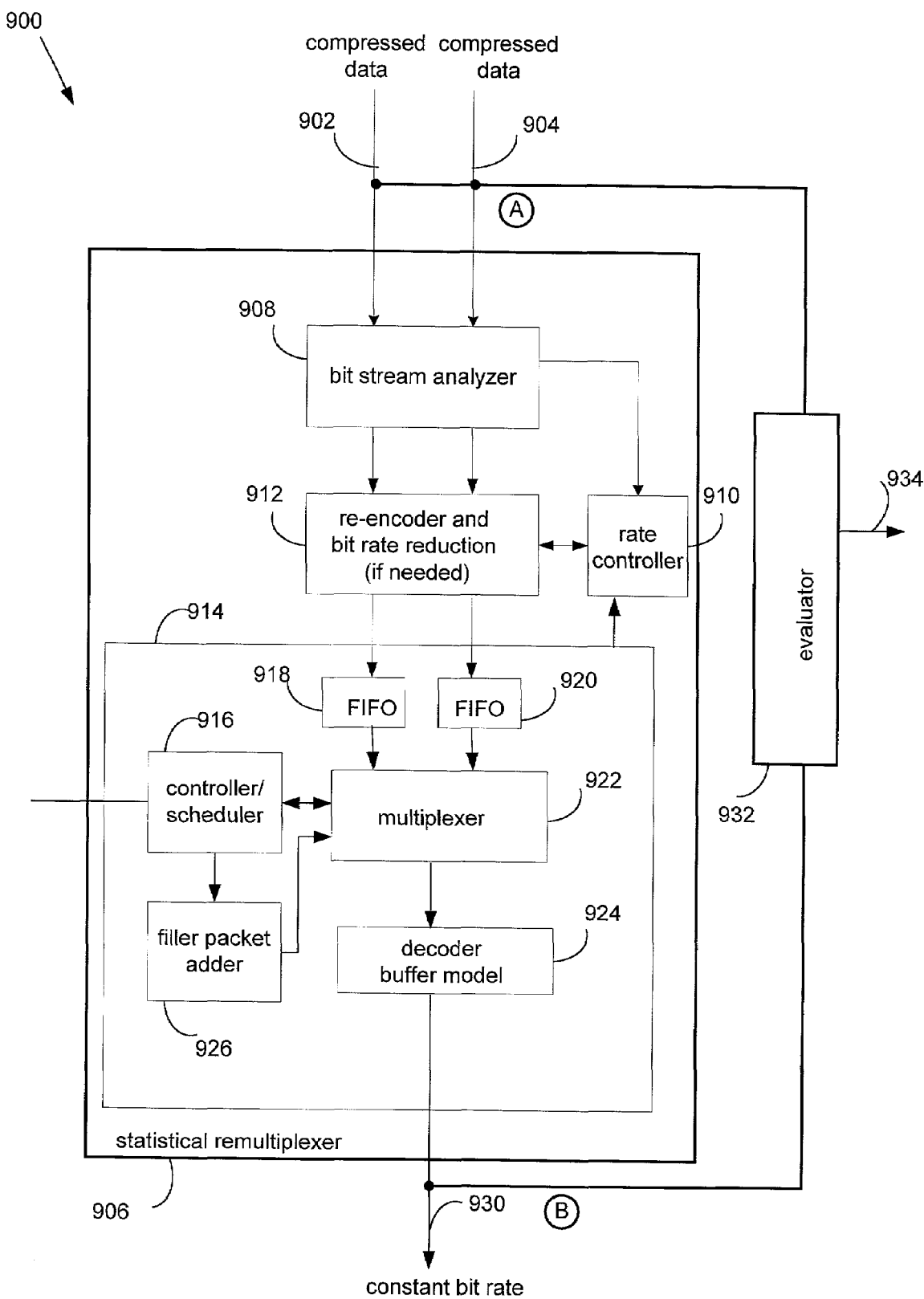
FIG. 9 illustrates an architecture including an evaluator that is separate from a statistical remultiplexer according to another embodiment of the present invention.

FIG. 9 illustrates an architecture 900 including an evaluator 932 that is separate from a statistical remultiplexer 906 according to another embodiment of the present invention. As illustrated, the evaluator 932 may be provided as a separate device from the statistical remultiplexer 906. This embodiment permits the evaluator 932 to be used with different statistical remultiplexers and is well suited for conducting comparisons of the performance of different statistical remultiplexers.

In one embodiment, the evaluator 932 may be connected or coupled to each input bit stream 902 and 904 and the output bit stream 930 for gathering data used in generating one or more evaluation metrics. An external evaluator 932 can in most cases still determine data related to input and output rates, amount of null packets, video quality, decoder buffer fullness, number of frames that undergo bit rate reduction, and the amount of bit rate reduction per frame. However, the computational complexity of performing this with an external evaluator 932 may be slightly higher than with an integrated evaluator.

There are several parameters that may be used to measure and evaluate the performance of a statistical remultiplexer. Discussed below are various methods that provide quantitative evaluation metrics associated with the performance of a statistical remultiplexer that may be used in evaluating its performance. The methods of the present invention are described herein as implemented by an evaluator apparatus as earlier described with reference to FIGS. 8 and 9. However, it will be appreciated that the methods of the present invention may be practiced independent of an evaluator using other mechanisms which allow for the gathering of data and generation of evaluation metrics as described within the scope of the present invention.

Evaluation Metrics

Broadly viewed, the methods of the present invention provide for gathering of first data associated with the performance of a statistical remultiplexer. The evaluator of the present invention then generates second data from the first data, where the second data is an evaluation metric that is a quantitative measure of the performance of the statistical remultiplexer. The evaluation metric may be used to evaluate the performance of the statistical remultiplexer.

Figure 10:
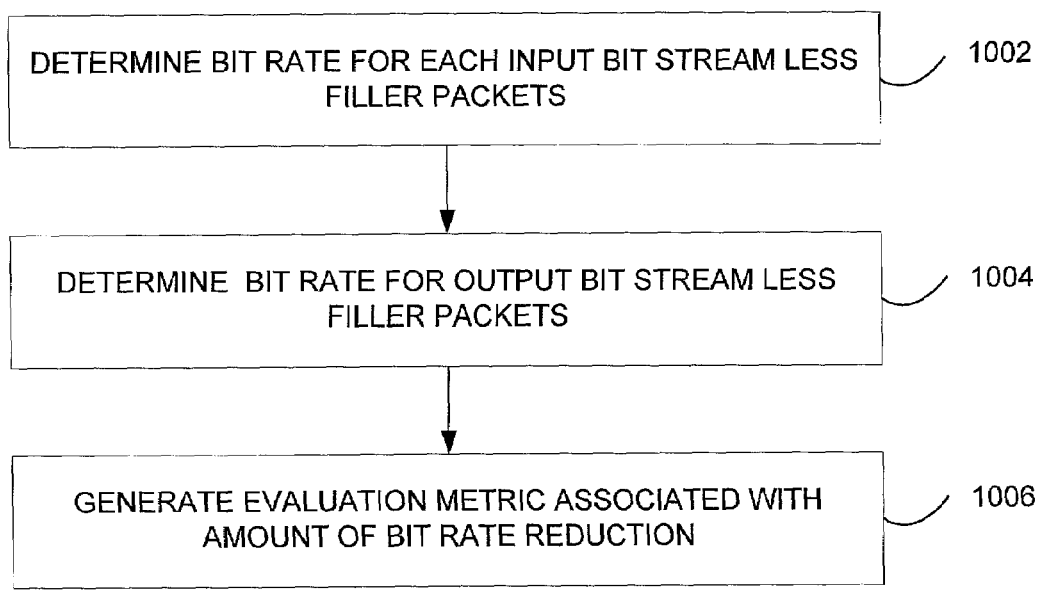
FIG. 10 is a flow diagram illustrating a method for generating an evaluation metric associated with the amount of bit rate reduction performed by a statistical remultiplexer according to one embodiment of the present invention.

FIG. 10 is a flow diagram illustrating a method for generating an evaluation metric associated with the amount of bit rate reduction performed by a statistical remultiplexer according to one embodiment of the present invention. Ideally, a statistical remultiplexer would allocate as much bandwidth as each bit stream requires while minimizing data rate reductions or drops. One assumption underlying this evaluation metric is that a statistical remultiplexer that can shuffle the bit streams without resorting to a bit rate reduction process is a better statistical remultiplexer.

In one embodiment, the evaluator generates an evaluation metric associated with the amount of bit rate reduction performed by a statistical remultiplexer. This metric provides a quantitative measure of the amount a statistical remultiplexer reduces the input bit rate, for example, using bit rate reduction processes, such as re-encoding or transcoding. In one example, at process 1002, the evaluator determines the bit rate of at least a portion of each input compressed bit stream input to the statistical remultiplexer. As some bit streams carry a lot of filler packets, such as null packets, stuffing packets, and opportunistic data packets, which provide no information when measuring the bit rates, the bit rate spent on filler packets is preferably not included in the rate calculation. In some instances, this may include a determination of the amount of filler packets and the reduction of the bit rate by the amount of filler packets.

At process 1004, the evaluator determines the output bit rate, again preferably less any filler packets, for at least a portion of the output bit stream from the statistical remultiplexer. At process 1006, the evaluator generates an evaluation metric associated with the amount of bit rate reduction.

It will be appreciated that a wide variety of algorithms may be used for calculating the amount of bit rate reduction. For example, the evaluator may sum the input bit rates of all portions of the input bit streams, such as portions of each bit stream present in the bit stream analyzer, e.g., look-ahead window buffer (less any filler packets), subtract the bit rate of the output channel (less any filler packets), divide by the bit rate of the input channel, and multiply by 100 to determine the percentage of bit rate reduction. If the total average rate for all channels does not exceed the channel capacity, then, the lesser the amount of bit rate reduction, the better the statistical remultiplexing scheme. The determination of the amount of bit rate reduction may also be repeatedly calculated to obtain an average, median and/or minimum and maximum bit rate reduction evaluation metric associated with some period of time, as well as statistical analyses, such as variance. This metric may also be computed and provided separately for each type of picture (I, P, B).

The distribution of an instantaneous rate of an input channel bit rate is a function of time. The evaluation metric provides such a distribution; also, it provides the output bit rate distribution, and the difference of the two distributions. Obviously, the change of bit rate directly results from the statistical remultiplexer. By smoothing the rise of the input bit rate, the statremux can more likely fit the input bit streams within the output channel without requiring more rate reduction if the sum of the incoming bit streams in average fits the available output channel bandwidth.

The above evaluation metric provides a somewhat high-level view of the amount of rate reduction performed by a statistical remultiplexer. In some instances, it may be desirable to evaluate a statistical remultiplexer with regard to more detailed aspects of the bit rate reduction process. Thus, in another embodiment, an evaluation metric that measures bit rate reduction characteristics may be determined, such as the amount of frames in a bit stream that are subjected to bit rate reduction; and of the frames subjected to bit rate reduction, the amount of bit reduction per frame. Further, various statistics associated with these measures such as mean, median and variance measures may also be generated as evaluation metrics.

Figure 11:
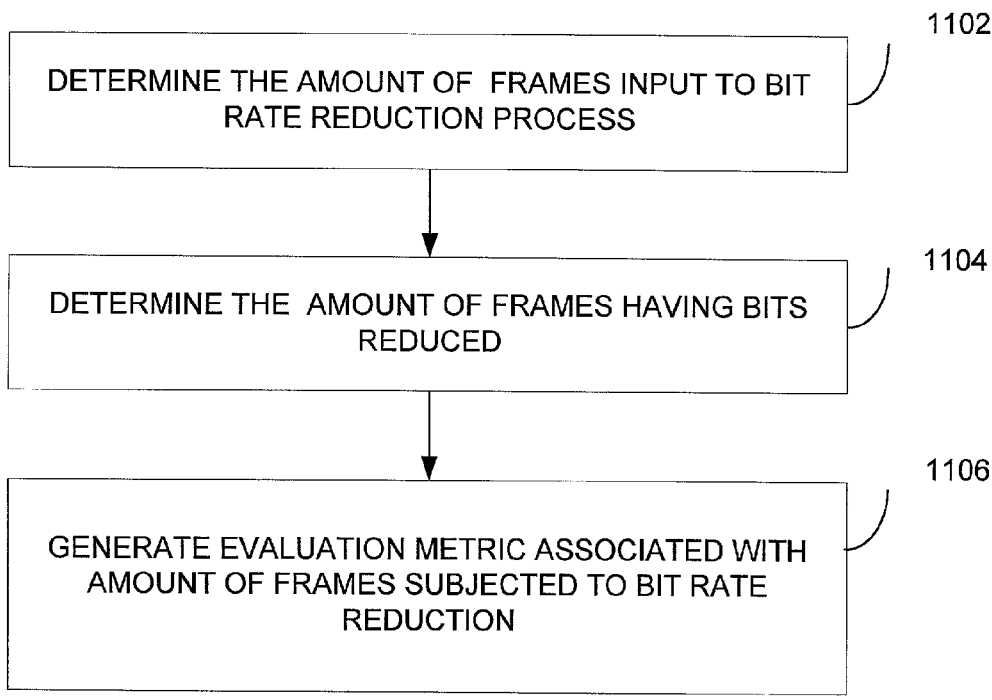
FIG. 11 is a flow diagram illustrating a method for generating an evaluation metric associated with bit rate reduction characteristics of a statistical remultiplexer according to another embodiment of the present invention.

FIG. 11 is a flow diagram illustrating a method for generating an evaluation metric associated with bit rate reduction characteristics of a statistical remultiplexer according to another embodiment of the present invention. The present evaluation metric measures characteristics of the bit rate reduction process performed by a statistical remultiplexer that indicate the smoothness of bit rate reduction, such as the number of frames undergoing bit rate reduction, the amount of bit reduction per frame, average and variance of the percentage of frames undergoing bit reduction, and also the average and variance of the percentage of bits reduced per frame.

In one embodiment, at process 1102, the evaluator determines the number of frames in a portion of a bit stream input to a bit rate reduction process.

At process 1104, the evaluator determines the number of frames subjected to bit rate reduction.

At process 1106, the evaluator generates an evaluation metric associated with the amount of frames actually reduced by the bit reduction process.

It will be appreciated that a wide variety of algorithms may be used for calculating the amount of frames that are bit reduced. For example, the evaluator may divide the total number of frames that were reduced over a time period by the total number of frames input to bit rate reduction process during that time period, and multiply the result by 100 to obtain the percentage of frames that were subjected to rate reduction over that time period.

In another embodiment, the evaluator may generate an evaluation metric associated with the amount of bits a frame is reduced. This evaluation metric provides more detailed information on the amount of reduction that occurs to a frame if it is reduced. In further embodiments, the evaluator may generate evaluation metrics associated with bit rate reduction characteristics over a period of time, such as the average and variance in the amount of frames that are reduced and the amount of bits reduced per frame.

Although the evaluation metrics associated with the amount of bit rate reduction are useful indicators of the performance of a statistical remultiplexer, it may occur that two statremuxs have the same amount of bit rate reduction, but the actual video quality produced by a statistical remultiplexer could be very poor. Thus, the use of an additional evaluation metric can further evaluate the performance of a statistical remultiplexer with regard to video quality.

Figure 12:
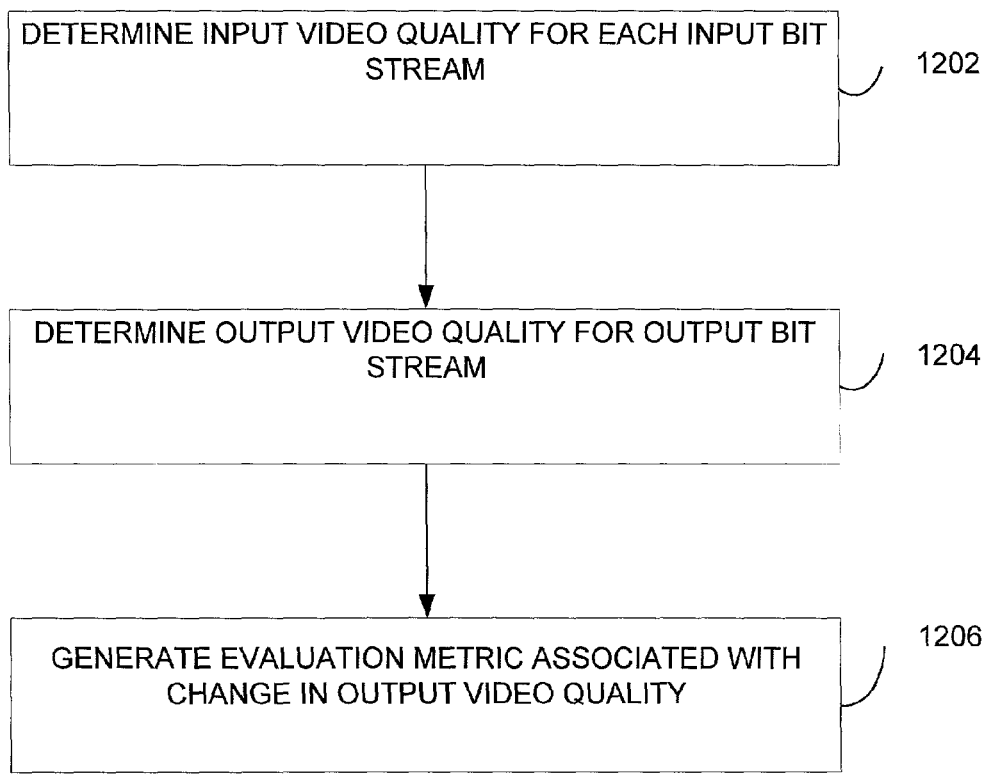
FIG. 12 is a flow diagram illustrating a method for generating an evaluation metric associated with the amount of change in video quality output by a statistical remultiplexer according to another embodiment of the present invention.

FIG. 12 is a flow diagram illustrating a method for generating an evaluation metric associated with the amount of change in video quality output by a statistical remultiplexer according to another embodiment of the present invention. An assumption underlying this evaluation metric is that the quality of video or audio cannot improve upon what is originally provided in the original compressed bit streams by further compression, re-encoding, or transcoding. Thus, this evaluation metric determines the quality of the output bit stream of the statistical remultiplexer as compared to the video quality of the input bit stream(s). There are a wide variety of video quality measurement parameters that may be used to compare the video quality of the bit streams, for example, a signal-to-noise ratio (SNR) or pixel measurements.

In one embodiment, at process 1202, the evaluator determines an input bit stream measure, such as by measuring the input bit stream signal strength or by decoding a portion of the input bit stream to determine input pixel measure data.

At process 1204, the evaluator determines the output bit stream measure, for example, by measuring the output bit stream signal strength or by decoding a portion of the output bit stream to determine output pixel measure data.

At process 1206, the evaluator generates an evaluation metric associated with the video quality output by the statistical remultiplexer. For example, SNR compares two video bit streams. In one example, the input video stream would be viewed as the original video stream and the SNR of the output bit stream would be computed with respect to the input, or original, video stream. The higher the SNR, the better the video quality.

In another example, the pixel measures of the input and output video streams may be differenced, or a mean square difference analysis performed. In other embodiments, the evaluator may invoke a video quality program or algorithm, in which case, processes 1202 and 1204 must determine appropriate input and output video quality data.

In another example, the average quantization level of the input and output bit streams may be measured and the results compared. The lower the quantization level, the better the video quality.

There are other measurement techniques which can be used to measure the video quality. Such techniques can be used to measure the quality of the input and output bit streams independently and then the two results are compared. For example, another technique assumes the availability of the original video signal, prior to being encoded. The SNR is computed for the input video signal with respect to the original signal. Similarly, the SNR is computed for the output video signal with respect to the original video signal.

As earlier discussed, MPEG permits statistical remultiplexers to utilize would-be wasted output bandwidth by shuffling data around in a buffer or by utilizing other processes, such as bit rate reduction schemes. When a statistical remultiplexer cannot utilize the allocated output bandwidth, filler packets, such as null packets, may be inserted in the output bit stream to provide the desired bit rate. This is particularly useful in a system having a variable rather than a constant bit rate. Currently, the MPEG-2 ISO specification defines a null packet size as 188 bytes. Thus, measuring the amount of null packets in the output bit stream, e.g., wasted output bandwidth, provides another evaluation metric for evaluating the performance of a statistical remultiplexer. The null rate is a single number for the entire multiplexed output from the statistical remultiplexer.

Figure 13:
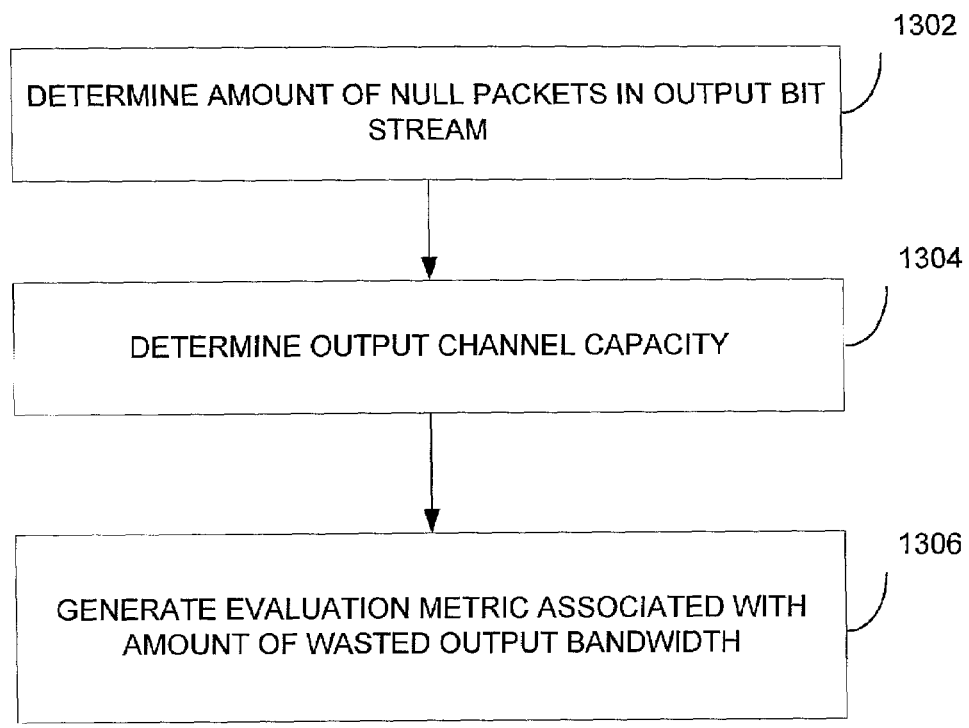
FIG. 13 is a flow diagram illustrating a method for generating an evaluation metric associated with the amount of wasted output bandwidth in an output bit stream of a statistical remultiplexer according to another embodiment of the present invention.

FIG. 13 is a flow diagram illustrating a method for generating an evaluation metric associated with the amount of wasted output bandwidth present in the output channel of a statistical remultiplexer according to another embodiment of the present invention.

In one embodiment, at process 1302, the evaluator determines the amount of null packets present in a portion of the output bit stream of the statistical remultiplexer, for example, in terms of bytes, over some time period, x. This may be determined, for example, at the multiplexer or at the output bit stream.

At process 1304, the evaluator determines the output channel capacity.

At process 1306, the evaluator generates an evaluation metric associated with the amount of wasted output bandwidth.

A wide variety of algorithms may be used in determining the amount of wasted output bandwidth using null packet measures. In one example, the percentage of wasted bandwidth may be calculated as:

$$\% \text{ wasted bandwidth} = \frac{(\# \text{ null packets}/x \text{ secs})(\# \text{ bits per null packets})(100)}{\text{channel capacity in bits/sec.}}$$

Statistical remultiplexers that include fewer null packets better utilize the available output channel capacity.

As earlier discussed, the size of the decoder buffer model is determined by MPEG specification, thus most statistical remultiplexers leverage the fullness of the decoder buffer model to manipulate the sending rates of programs in the one or more bit streams over the output bit stream so as to avoid overflow or underflow of a receiving decoder buffer. Statistical remultiplexers that can maintain a high decoder buffer model fullness are more capable of sustaining a consistent output bit stream to a receiving decoder through periods where bandwidth is scarce. Thus, measuring the characteristics of the level of the decoder buffer model fullness provides a measure of the fine control that the statistical remultiplexer has over the decoder buffer model.

Figure 14:
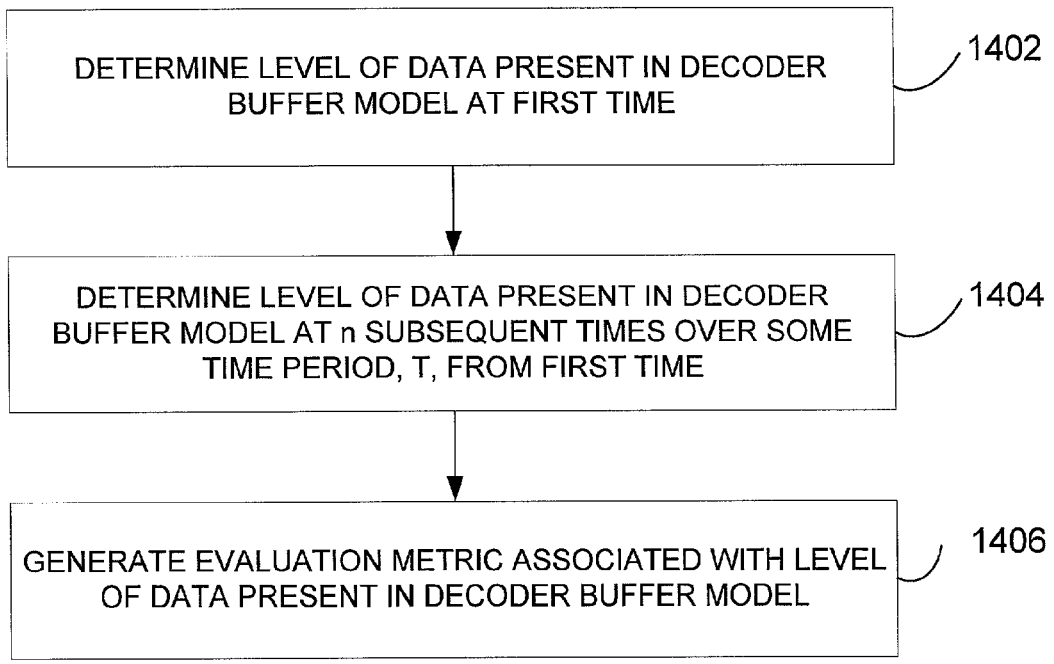
FIG. 14 is a flow diagram illustrating a method for generating an evaluation metric associated with the level of data present in a decoder buffer model of a statistical remultiplexer according to another embodiment of the present invention; and, FIG. 15 is a flow diagram illustrating a method for generating an evaluation metric associated with time delay of a statistical remultiplexer according to another embodiment of the present invention.

FIG. 14 is a flow diagram illustrating a method for generating an evaluation metric associated with the level of data present in a decoder buffer model of a statistical remultiplexer according to another embodiment of the present invention. The present embodiment may be utilized to provide evaluation metrics associated with the level of data present in a decoder buffer model, such as the mean, variance, average and maximum and minimum levels of data present in the decoder buffer model over some time interval, T. The data levels may be measured in various ways, such as in terms of the amount of bits, bytes, data packets, or in units of time, or other measure, such as number of pictures in the decoder buffer model.

In one embodiment, at process 1402, the evaluator determines the level of data present in a decoder buffer model at a first time. The first time may be determined in a variety of ways, such as by a time stamp on a packet input to the decoder buffer model, or according to a reference clock in the evaluator, statistical remultiplexer or in a system associated with the statistical remultiplexer.

At process 1404, the evaluator determines one or more subsequent levels of data present in the decoder buffer model at one or more times subsequent to the first time over some time interval, T, measured from the first time. The one or more subsequent times may be determined, for example, by a time stamp on a packet output from the decoder buffer model, or according to a reference clock in the evaluator, statistical remultiplexer, or in a system associated with the statistical remultiplexer. The subsequent times may be determined according to a set rate, such as x times per second, or in accordance with an event, such as every time a picture is decoded.

At process 1406, the evaluator generates an evaluation metric associated with the level of data present in the decoder buffer model. For example, the evaluation metric is associated with the level of data present in the decoder buffer model over some time interval, T, such as: the mean level of data; the maximum and/or minimum level of data; the variance in the level of data; and, the median level of data.

It will be appreciated that the various algorithms used in calculating the statistical values discussed above, e.g., mean, variance, max/min, and average, from a set of data points are well known and not further illustrated herein.

In other embodiments, the evaluator may use different identifying characteristics of the data packet, or bit stream. Further, the evaluator may measure the change in the level of data in the decoder buffer model.

While the presence of the decoder buffer model, bit analyzer (look-ahead window buffer), and bit rate reduction processes may enable a statistical remultiplexer to provide a high quality output with little wasted output bandwidth or loss of input signal, these processes take time. The time a statistical remultiplexer may utilize in processing input channels is not, however, unlimited, as the desired result is a product that should be timely communicated to a receiver, such as a cable customer. Thus, delay by a statistical remultiplexer is another evaluation metric that may be used in evaluating the performance of a statistical remultiplexer.

Figure 15:
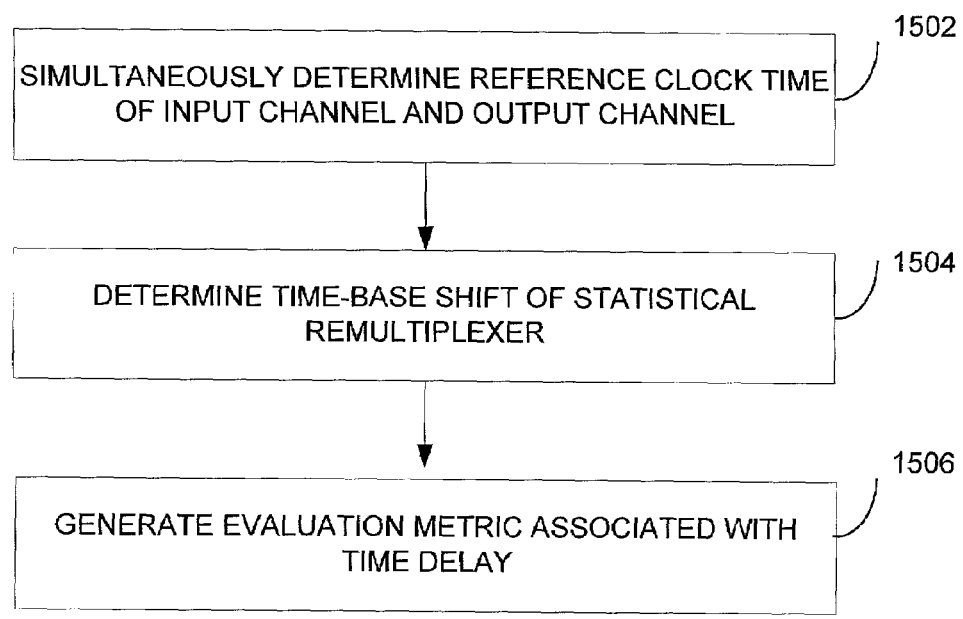

FIG. 15 is a flow diagram illustrating a method for generating an evaluation metric associated with delay of a statistical remultiplexer according to another embodiment of the present invention. This evaluation metric provides a measure of the amount of time a bit stream is delayed by a statistical remultiplexer.

In one embodiment, at process 1502, the evaluator simultaneously determines the reference clock time, i.e., the PCR, of the channel being input to the statistical remultiplexer and the reference clock time of the output channel. Generally, the difference between the reference clock times of the input and output channels would serve as a measure of the delay introduced by the statistical remultiplexer.

In some instances, however, the statistical remultiplexer introduces a time base-shift to the output reference clock time so that the difference between the reference clock times measured at process 1502 is not an accurate reflection of the delay. Thus, the time difference should be compensated to account for the time-base shift introduced by the statistical remultiplexer.

At process 1504, the evaluator determines the time-base shift of the statistical remultiplexer. It will be appreciated that the time-base shift of a statistical remultiplexer can be calculated in a variety of ways. In one example, the time-base shift may be obtained by determining the presentation time stamp (PTS) of a picture input to the statistical remultiplexer and the PTS of the same picture output from the statistical remultiplexer. The difference of the input and output PTS is the time-base shift introduced by the statistical remultiplexer.

At process 1506, the evaluator generates the evaluation metric associated with time delay of the statistical remultiplexer. For example, the evaluator may calculate the difference of the reference clock times from process 1502 and then compensate the difference by the time-base shift determined at process 1504. In some cases, this may be by subtracting or adding an amount of time to the difference. The resultant compensated difference may then serve as an evaluation metric that is a measure of the time delay of the statistical remultiplexer, such as in milliseconds.

It will be appreciated that a wide variety of algorithms may be used for calculating the time delay and the time-base shift. Additionally, the time delay may be calculated many times over a time interval, T, to enable the generation of the evaluation metric as a statistical measure such as average delay, median delay, variance of delay, and min/max delays.

To better evaluate the performance of a statistical remultiplexer, it is preferred that the above described evaluation metrics be determined under a number of testing conditions. For example, evaluation metrics such as those described above may be determined at the following times: when bandwidth demands are all the time below the available bandwidth; when bandwidth demands are mostly below the available bandwidth but there are peaks in bandwidth requirements that occasionally exceed availability; when bandwidth demands are most of the time above the available bandwidth; when bandwidth demands are all the time above the available bandwidth; when the bandwidth demands vary over a large dynamic range; and, when the bandwidth demands vary rapidly with time.

The above methods and apparatus of the present invention provide quantitative evaluation metrics for evaluating the performance of a statistical remultiplexer. Being objective measures, the present invention provides repeatable and reproducible objective evaluation metrics that may prove advantageous in development testing and regression testing of statistical remultiplexers, and in some embodiments, for comparison of different statistical remultiplexers. The methods and apparatus of the present invention may be extended to different types of statistical remultiplexers, including those having mechanisms for extraction of information embedded in the bit stream, and to other multiplexing systems.

The methods of the present invention may be implemented on various systems. For example, the invention may be implemented on network devices such as routers and/or switches. Further, the invention may be at least partially implemented on a card (e.g., an interface card) for a network device or a general-purpose computing device.

The present invention may be implemented as machine readable media, such as computer readable media, that include program instructions, state information, etc., for performing various operations described herein. Examples of machine-readable media include, but are not limited to, magnetic media such as hard disks, floppy disks, and magnetic tape; optical media, such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Further, although a compressed bit stream typically comprises a multiplex of compressed audio, video and auxiliary data bit streams, the above-described embodiments are illustrated primarily with reference to compressed video data. However, it is understood that any compressed audio and auxiliary data, such as compressed audio and auxiliary data related to the output of the video data, may also be the basis for the embodiments as described herein.

While this invention has been described in terms of several preferred embodiments, there are alterations, permutations, and equivalents that fall within the scope of this invention which have been omitted for brevity's sake. It is therefore intended that the scope of the invention should be determined with reference to the appended claims.

What is claimed is:

1. An apparatus for generating one or more evaluation metrics associated with the performance of a statistical remultiplexer as a whole, the apparatus comprising:
   a first input for receiving information related to an input bit stream to the statistical remultiplexer;
   a second input for receiving information related to an output bit stream from the statistical remultiplexer;
   logic for generating said one or more evaluation metrics using the received information from both said input and said output bit streams, wherein the information related to the input bit stream(s) and the output bit stream is obtained for one or more frames and input to a data reduction process over a specified time period and wherein the evaluation metric is an average value over the specified time period; and
   at least one output for outputting said one or more evaluation metrics of the statistical remultiplexer to provide a quantitative measure of the performance of the statistical remultiplexer.

2. The apparatus as recited in claim 1, wherein the evaluation metric is selected from a group comprising: an amount of bit rate reduction, a change in video quality, wasted output bandwidth, decoder buffer model data level, bit rate reduction characteristics, and time delay.

3. The apparatus as recited in claim 1, wherein the apparatus is integrated into a statistical remultiplexer.

4. The apparatus as recited in claim 1, wherein the apparatus is separate from and connectable to a statistical remultiplexer.

5. A method for generating one or more evaluation metrics associated with the performance of a statistical remultiplexer as a whole, the method comprising:
   receiving information related to an input bit stream to the statistical remultiplexer;

receiving information related to an output bit stream from the statistical remultiplexer;

generating an evaluation metric utilizing the information received from the input bit stream(s) and the output bit stream, wherein the information related to the input bit stream(s) and the output bit stream is obtained for one or more frames and input to a data reduction process over a specified time period and wherein the evaluation metric is an average value over the specified time period; and outputting said evaluation metric of the statistical remultiplexer to provide a quantitative measure of the performance of the statistical remultiplexeer as a whole.

6. The method as recited in claim 5, wherein receiving information related to an input bit stream comprises determining an input bit rate of said input bit stream, receiving information related to an output bit stream comprises determining an output bit rate of said output bit stream, and generating an evaluation metric comprises determining the amount of bit rate reduction performed by the statistical remultiplexer as a whole.

7. The method as recited in claim 6, wherein the input bit rate(s) of the input compressed bit stream(s) do not include a bit rate attributable to filler packets present in the portion of the input compressed bit stream(s), and wherein the output compressed bit rate does not include a bit rate attributable to filler packets.

8. The method as recited in claim 5, wherein the amount of bit rate reduction is a percentage of bit rate reduction.

9. The method as recited in claim 5, wherein the evaluation metric is generated by an evaluator.

10. The method as recited in claim 5, wherein receiving information related to an input bit stream comprises determining input video quality of said input bit stream receiving output information related to an output bit stream comprises determining output video quality of said output bit stream, and generating an evaluation metric comprises determining a difference in video quality between the input bit stream(s) and the output bit stream.

11. The method as recited in claim 10, wherein the difference in video quality is based upon pixel measurements.

12. The method as recited in claim 10, wherein the difference in video quality is a means square difference.

13. The method as recited in claim 10, wherein difference in video quality is based upon a signal-to-noise ratio.

14. The method as recited in claim 5, wherein the evaluation metric is selected from a group comprising: an amount of bit rate reduction performed, number of frames subjected to bit rate reduction, number of bits reduced per frame, change in video quality, wasted output bandwidth, decoder buffer model data level, bit rate reduction characteristics, and time delay.

15. A device for generating one or more evaluation metrics associated with the performance of a statistical remultiplexer, the device comprising:

means for receiving information related to an input bit stream to the statistical remultiplexer;

means for receiving information related to an output bit stream from the statistical remultiplexer;

means for generating one or more evaluation metrics using the received information from both said input and said output bit streams, wherein the information related to the input bit stream(s) and the output bit stream is obtained for one or more frames and input to a data reduction process over a specified time period and wherein the evaluation metric is an average value over the specified time period; and means for outputting said one or more evaluation metrics of the statistical remultiplexer to provide a quantitative measure of the performance of the statistical remultiplexeer as a whole.

16. The device as recited in claim 15, wherein the evaluation metric is selected from a group comprising: an amount of bit rate reduction performed by the statistical remultiplexer, a change in video quality attributable to the statistical remultiplexer, wasted output bandwidth by the statistical remultiplexer, decoder buffer level fullness, bit rate reduction characteristics of the statistical remultiplexer, and time delay attributable to the statistical remultiplexer.

17. A computer readable medium containing an executable computer program for generating one or more evaluation metrics associated with the performance of a statistical remultiplexer as a whole, comprising:

computer code for receiving information related to an input bit stream to the statistical remultiplexer;

computer code for receiving information related to an output bit stream from the statistical remultiplexer;

computer code for generating one or more evaluation metrics utilizing the information received from the input bit stream and the output bit stream, wherein the information related to the input bit stream(s) and the output bit stream is obtained for one or more frames and input to a data reduction process over a specified time period and wherein the evaluation metric is an average value over the specified time period;

computer code for outputting said one or more evaluation metrics of the statistical remultiplexer to provide a quantitative measure of the performance of the statistical remultiplexeer as a whole; and computer readable medium for storing the computer code.

18. The computer readable medium of claim 17, wherein the evaluation metric is selected from a group comprising: an amount of bit rate reduction performed by the statistical remultiplexer, a change in video quality attributable to the statistical remultiplexer, wasted output bandwidth by the statistical remultiplexer, decoder buffer level fullness, bit rate reduction characteristics of the statistical remultiplexer, and time delay attributable to the statistical remultiplexer.

* * * * *